Patented Feb. 23, 1932

1,846,133

UNITED STATES PATENT OFFICE

BERTRAM MAYER, KARL KRAUER, AND HUGO SIEBENBÜRGER, OF BASEL, SWITZERLAND, ASSIGNORS TO THE FIRM: SOCIETY OF CHEMICAL INDUSTRY IN BASLE, OF BASEL, SWITZERLAND

VAT DYESTUFFS OF THE ANTHRAQUINONE SERIES AND PROCESS OF MAKING SAME

No Drawing. Application filed January 3, 1929, Serial No. 330,134, and in Switzerland January 17, 1928.

The present invention refers to new vat dyestuffs yielding grey tints. It comprises the new products, the process of making same, and the material which has been dyed with the new products.

It has been found that new and valuable grey dyeing vat dyestuffs are obtained, by fusing, in a first step, a sulfonic acid of a symmetrical dibenzanthronil of the general formula

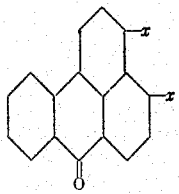

wherein the one of the two $x$'s stands for a hydrogen atom and the other for the second benzanthrone residue, with caustic potash at raised temperatures, and then treating, in a second step, the compounds so obtained with an alkylating agent. In the expression at raised temperatures we understand those temperatures which are commonly used in connection with the so-called alkali fusions, particularly suitable being those ranging between 250–300° C. As alkylating agents there are particularly coming into consideration the esters which are formed by the alcohols containing less than 3 carbon atoms and the aromatic monosulfonic acids, such as, inter alia, the alkyl and methyl esters of the benzene and toluene sulfonic acids, or still other sulfonic acids. The constitution of the new products is not known. They form grey-black powders, dissolving in concentrated sulfuric acid to a blue solution and yielding with sodium hydrosulfite and caustic soda solution violet vats from which cotton, after exposing it to the action of the air, is dyed fast grey tints.

The following examples illustrate the invention, without, however, limiting the same; the parts being by weight:—

Example 1

10 parts of the sulfonic acid of the dibenzanthronil of the formula

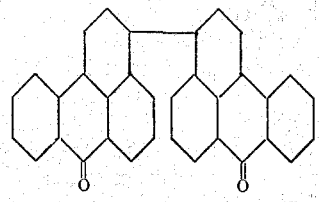

are introduced into 50 parts of fused caustic potash at 180° C. The temperature is then raised to 260° C. and fusion continued for an hour whilst stirring, at 260–265° C. The cooled mass is dissolved in water, the dyestuff caused to separate by blowing in air, and then filtered and washed. When dry, the dyestuff is a violet brown powder which dissolves in sulfuric acid to a blue solution. From the latter it separates in the form of blue-green flocks on dilution with water. It dyes cotton in a red violet fluorescent vat greenish grey tints.

A like dyestuff is obtained from the sulfonic acid of the dibenzanthronil of the formula

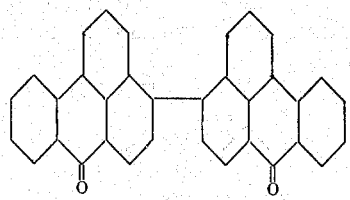

The hitherto unknown Bzl, Bzl'-dibenzanthronil sulfonic acid may be made as follows:—10 parts of Bzl, Bzl'-dibenzanthronil are dissolved in 100 parts of fuming sulfuric acid containing 12 per cent. of anhydride. After some hours the yellow brown solution is poured into water and the sulfonic acid is salted out with common salt, filtered and washed with common salt solution until neutral. It is a brown powder which dissolves in sulfuric acid to a violet red solution. The aqueous solution is red brown, becoming yellow brown on addition of alkali. The dyestuff dyes wool yellow.

Example 2

5 parts of the finely sub-divided product obtained according to the first paragraph of Example 1, 30 parts of nitrobenzene, 10 parts of anhydrous sodium carbonate and 15 parts of paratoluene sulfonic acid methyl ester are heated together to boiling point in a reflux apparatus for some hours; preferably the sodium carbonate and ester are added gradually in portions. The dyestuff passes into solution, which is blue. After cooling and filtering, the residue is washed with alcohol and water. When dried it is a grey black powder which dissolves in sulfuric acid to a blue solution. It dyes cotton in a violet vat greenish grey tints which have valuable properties of fastness.

A like product is obtained by methylating the fusion product of the sulfonic acid of the 2-2'-dibenzanthronil.

What we claim is:—

1. As step in the manufacture of new dyestuffs of the anthraquinone series, the production of new products by fusing with caustic potash at raised temperatures the sulfonic acids of the symmetrical dibenzanthronils of the general formula

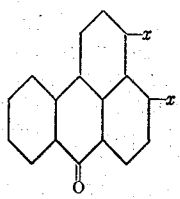

wherein the one of the two $x$'s stands for a hydrogen atom and the other for the second benzanthrone residue.

2. As step in the manufacture of new dyestuffs of the anthraquinone series, the production of new products by fusing with caustic potash at temperatures between 250–300° C. the sulfonic acids of the symmetrical dibenzanthronils of the general formula

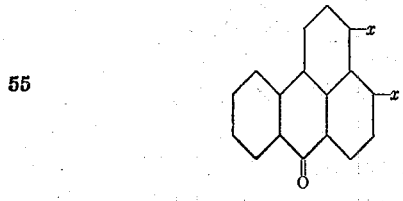

wherein the one of the two $x$'s stands for a hydrogen atom and the other for the second benzanthrone residue.

3. As step in the manufacture of new dyestuffs of the anthraquinone series, the production of new products by fusing with caustic potash at temperatures between 260–270° C. the sulfonic acids of the symmetrical dibenzanthronils of the general formula

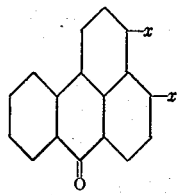

wherein the one of the two $x$'s stands for a hydrogen atom and the other for the second benzanthrone residue.

4. As step in the manufacture of new dyestuffs of the anthraquinone series, the heating with alkylating agents of the products which are obtained by fusing with caustic potash at raised temperatures the sulfonic acids of the symmetrical dibenzanthronils of the general formula

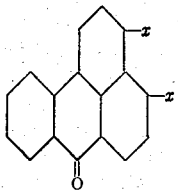

wherein the one of the two $x$'s stand for a hydrogen atom and the other for the second benzanthrone residue.

5. As step in the manufacture of new dyestuffs of the anthraquinone series, the heating with alkylating agents of the products which are obtained by fusing with caustic potash at temperatures between 250–300° C. the sulfonic acids of the symmetrical dibenzanthronils of the general formula

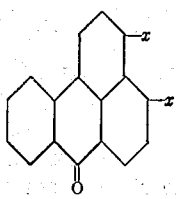

wherein the one of the two $x$'s stands for a hydrogen atom and the other for the second benzanthrone residue.

6. As step in the manufacture of new dyestuffs of the anthraquinone series, the heating with alkylating agents of the products which are obtained by fusing with caustic potash at temperatures between 260–270° C. the sulfonic acids of the symmetrical dibenzanthronils of the general formula

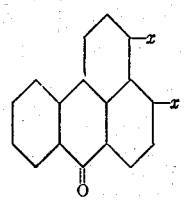

wherein the one of the two $x$'s stands for a hydrogen atom and the other for the second benzanthrone residue.

7. As step in the manufacture of new dyestuffs of the anthraquinone series, the heating of the products which are obtained by fusing with caustic potash at raised temperatures the sulfonic acids of the symmetrical dibenzanthronils of the general formula

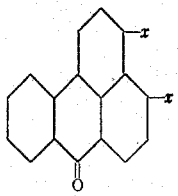

wherein the one of the two $x$'s stands for a hydrogen atom and the other for the second benzanthrone residue, with the esters produced from such alcohols containing less than 3 carbon atoms, and aromatic mono-sulfonic acids.

8. As step in the manufacture of new dyestuffs of the anthraquinone series, the heating of the products which are obtained by fusing with caustic potash at temperatures between 250–300° C. the sulfonic acids of the symmetrical dibenzanthronils of the general formula

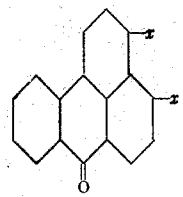

wherein the one of the two $x$'s stands for a hydrogen atom and the other for the second benzanthrone residue, with the esters produced from such alcohols containing less than 3 carbon atoms, and aromatic mono-sulfonic acids.

9. As step in the manufacture of new dyestuffs of the anthraquinone series, the heating of the products which are obtained by fusing with caustic potash at temperatures between 260–270° C. the sulfonic acids of the symmetrical dibenzanthronils of the general formula

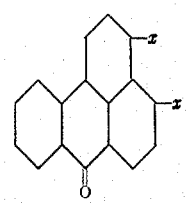

wherein the one of the two $x$'s stands for a hydrogen atom and the other for the second benzanthrone residue, with the esters produced from such alcohols containing less than 3 carbon atoms, and aromatic mono-sulfonic acids.

10. As a new process for the production of new dyestuffs of the anthraquinone series, the fusion with caustic potash at raised temperatures of the sulfonic acids of the symmetrical dibenzanthronils of the general formula

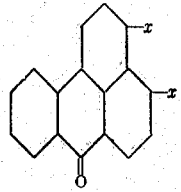

wherein the one of the two $x$'s stands for a hydrogen atom and the other for the second benzanthrone residue, followed by heating the products thus obtained with alkylating agents.

11. As a new process for the production of new dyestuffs, of the anthraquinone series, the fusion with caustic potash at raised temperatures of the sulfonic acids of the symmetrical dibenzanthronils of the general formula

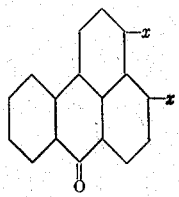

wherein the one of the two $x$'s stands for a hydrogen atom and the other for the second benzanthrone residue, and then heating the products thus obtained with the esters produced from such alcohols containing less than 3 carbon atoms, and aromatic mono-sulfonic acids.

12. As a new process for the production of new dyestuffs of the anthraquinone series, the fusion with caustic potash at temperatures between 250–300° C. of the sulfonic acids of the symmetrical dibenzanthronils of the general formula

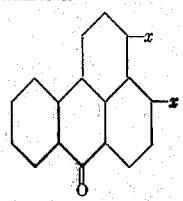

wherein the one of the two $x$'s stands for a hydrogen atom and the other for the second benzanthrone residue, and then heating the products thus obtained with the esters produced from such alcohols containing less than 3 carbon atoms, and aromatic mono-sulfonic acids.

13. As a new process for the production of new dyestuffs of the anthraquinone series, the fusion with caustic potash at temperatures between 260–270° C. of the sulfonic acids of the symmetrical dibenzanthronils of the general formula

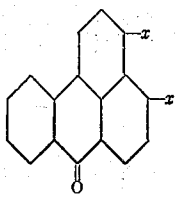

wherein the one of the two $x$'s stands for a hydrogen atom and the other for the second benzanthrone residue, and then heating the products thus obtained with the esters produced from such alcohols containing less than 3 carbon atoms, and aromatic monosulfonic acids.

14. As new products the vat dyestuffs of the anthraquinone series which are obtained by fusing with caustic potash at raised temperatures the sulfonic acids of the symmetrical dibenzanthronils of the general formula

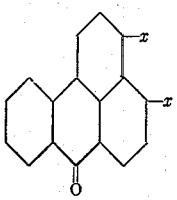

wherein the one of the two $x$'s stands for a hydrogen atom and the other for the second benzanthrone residue, followed by heating the products thus obtained with alkylating agents, which products form grey-black powders, dissolving in concentrated sulfuric acid to a blue solution and yielding with sodium hydrosulfite and caustic soda solution violet vats from which cotton, after exposing it to the action of the air, is dyed fast grey tints.

15. As new products the vat dyestuffs of the anthraquinone series which are obtained by fusing with caustic potash at temperatures between 250–300° C. the sulfonic acids of the symmetrical dibenzanthronils of the general formula

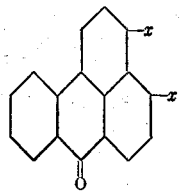

wherein the one of the two $x$'s stands for a hydrogen atom and the other for the second benzanthrone residue, followed by heating the products thus obtained with the esters produced from such alcohols containing less than 3 carbon atoms, and aromatic monosulfonic acids, which products form grey-black powders, dissolving in concentrated sulfuric acid to a blue solution and yielding with sodium hydrosulfite and caustic soda solution violet vats from which cotton, after exposing it to the action of the air, is dyed fast grey tints.

16. As new products the vat dyestuffs of the anthraquinone series which are obtained by fusing with caustic potash at temperatures between 260–270° C. the sulfonic acids of the symmetrical dibenzanthronils of the general formula

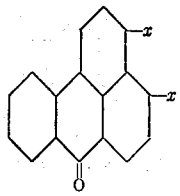

wherein the one of the two $x$'s stands for a hydrogen atom and the other for the second benzanthrone residue, followed by heating the products thus obtained with the esters produced from such alcohols containing less than 3 carbon atoms, and aromatic mono-sulfonic acids, which products form grey-black powders, dissolving in concentrated sulfuric acid to a blue solution and yielding with sodium hydrosulfite and caustic soda solution violet vats from which cotton, after exposing it to the action of the air, is dyed fast grey tints.

In witness whereof we have hereunto signed our names this 21st day of December, 1928.

BERTRAM MAYER.
KARL KRAUER.
HUGO SIEBENBÜRGER.